United States Patent
Tanaka et al.

(10) Patent No.: US 7,122,086 B2
(45) Date of Patent: Oct. 17, 2006

(54) ROLLING SUPPORT DEVICE AND METHOD FOR MANUFACTURING THE SAME

(75) Inventors: Susumu Tanaka, Yokohama (JP); Hiroyuki Ito, Chigasaki (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/958,989

(22) PCT Filed: Mar. 16, 2001

(86) PCT No.: PCT/JP01/02121

§ 371 (c)(1),
(2), (4) Date: Oct. 17, 2001

(87) PCT Pub. No.: WO01/69100

PCT Pub. Date: Sep. 20, 2001

(65) Prior Publication Data

US 2003/0094215 A1    May 22, 2003

(30) Foreign Application Priority Data

Mar. 17, 2000 (JP) ............................. 2000-076113
Jun. 22, 2000 (JP) ............................. 2000-187068

(51) Int. Cl.
*C23C 8/20* (2006.01)
*C22D 38/40* (2006.01)
*F16C 33/30* (2006.01)

(52) U.S. Cl. ............... 148/223; 148/225; 148/233; 148/235

(58) Field of Classification Search ............. 148/225, 148/234, 235, 319
See application file for complete search history.

(56) References Cited

U.S. PATENT DOCUMENTS

| | | | | |
|---|---|---|---|---|
| 4,443,406 A | * | 4/1984 | Sukekawa et al. | ........ 420/586.1 |
| 5,292,200 A | | 3/1994 | Matsumoto et al. | |
| 5,340,534 A | * | 8/1994 | Magee | ........ 420/35 |
| 6,143,094 A | * | 11/2000 | Sugiyama et al. | ........ 148/120 |
| 6,601,993 B1 | * | 8/2003 | Tanaka | ........ 384/492 |

FOREIGN PATENT DOCUMENTS

| | | |
|---|---|---|
| EP | 818555 | 1/1998 |
| GB | 2324305 | 10/1998 |
| JP | 9-249959 | 9/1997 |
| JP | 9-302456 | 11/1997 |

OTHER PUBLICATIONS

Blair, Malcolm, "Cast Stainless Steels", from Metals Handbook, 10th ed., pub. by ASM International, Mar. 1990, pp. 908-911.*

Blair, Malcolm, "Cast Stainless Steels", from Metals Handbook, 10th ed., pub. by ASM International, Mar. 1990, pp. 912.*

* cited by examiner

*Primary Examiner*—Harry D. Wilkins, III
(74) *Attorney, Agent, or Firm*—Crowell & Moring LLP (57) ABSTRACT

A rolling support device excellent in both of the characteristics of durability and corrosion resistance is provided. The inner ring (1) and the outer ring (2) comprises an austenitic stainless steel and has, on a raceway surface, a carburizing hardened layer containing no substantial carbides at a Vickers hardness (Hv) of 650 or more. The carburizing hardened layer is formed by applying fluoriding and then applying carburizing at a temperature of 540° C. or lower. The rolling element (3) is made of $Si_3N_4$.

2 Claims, 4 Drawing Sheets

ROLLING SUPPORT DEVICE AND METHOD FOR MANUFACTURING THE SAME

TECHNICAL FIELD

The present invention relates a rolling support device (for example, rolling bearing, ball screw and linear motion guide) and, more in particular, it relates to a rolling support device suitable to application uses requiring high corrosion resistance and application uses requiring high corrosion resistance and non-magnetic property.

BACKGROUND ART

Heretofore, as the material for raceway member (fixed member and moving member having a rolling raceway surface) for a rolling support device, SUJ2 has been used for bearing steel and steel materials corresponding to SCR420 and SCM420 have been used for case hardening steels. Since the rolling support device is used generally under repetitive shearing stress at a high surface pressure, for ensuring rolling contact fatigue life endurable to the shearing stress, hardness is adjusted to HRC 58 to 64 by applying quenching and tempering for case the bearing steel and applying quenching and tempering after carburizing or carbonitriding for case hardening steels.

However, the working circumstances for the rolling support devices are versatile. For example, in a case of a rolling support device for machineries used under a corrosive circumstance such as liquid crystal or semiconductor production facilities or foodstuff machines, when a bearing steel is used as the material, it may sometimes suffer from rust in an early stage to reach the bearing life. Thus, stainless steels are often used as the material when such corrosion resistance is required.

Stainless steels are generally classified into austenitic series, ferritic series, austenite-ferrite two phase series, martensitic series and precipitation hardened series. In the rolling bearing, since the contact portion between a rolling element and an outer ring or an inner ring undergoes wear and large shearing stress, martensitic stainless steels having high hardness and excellent in wear resistance are used mainly. Among them, SUS 440C having the highest hardness has been used most frequently. However, the martensitic stainless steel represented by SUS 440C is poor in the corrosion resistance compared with other stainless steels and is not always satisfactory.

On the other hand, those stainless steels other than the martensitic steels such as austenitic or ferritic steels are excellent in the corrosion resistance but have no sufficient hardness corresponding to the requirement in the rolling support device, so that no sufficient wear resistance and rolling life can be obtained. Particularly, in a case of requiring the corrosion resistance, those applied with hard Cr plating or coating layer comprising a fluorine-containing material to the carburized or carbonitrided case hardening steel or those applied with various kinds of other corrosion resistant layers than described above have been used. However, the deposited layer not in contiguous with the matrix phase involves a problem that it lacks in the layer strength, tending to cause peeling and no sufficient durability can be obtained for the rolling support device.

The present invention has been developed in order to solve the various problems that conflict to each other in the prior art and it is a first subject thereof to provide a rolling support device excellent in both of the characteristics of the corrosion resistance and the durability.

On the other hand, in the apparatus where magnetic fields cause a problem such as in production facilities for liquid crystal or semiconductor devices, medical inspection apparatus or linear motor cars, when a driving section is formed of a magnetic material, surrounding magnetic fields are disturbed upon driving to sometimes deteriorate the performance of the apparatus. Accordingly, in constituent components for the rolling support device used in such apparatus, those made of non-magnetic materials have to be used. Heretofore, constituent components made of beryllium-copper alloys or ceramics have been used.

However, the beryllium-copper alloys tend to suffer from oxidation and since the oxides are toxic substance, use of the beryllium-copper alloys as the material for the constituent components in the rolling support device is not preferred with a view point of environmental problems. Further, those made of beryllium-copper alloys have a low hardness of about 40 as Rockwell C hardness (HRC), so that they have a problem also in view of durability. Further, when ceramics are used as the material for constituent components in the rolling support device, they result in problems of increasing the cost and providing difficulty in enlarging the size and reducing the thickness.

Accordingly, precipitation hardening type austenitic non-magnetic steels such as Mn—Cr—V series or Mn—Cr—Ni—V series have been used in recent years. However, although such steels are somewhat excellent in the corrosion resistance over the martensitic stainless steels but still not yet sufficient. In addition, since the hardness is about 45 (HRC), such steels can not solve the problem of the durability when used as they are.

The method of improving the surface hardness of the steels described above can include, at first, a method of forming a hard ceramic coating on the surface by a PVD method or CVD method. In this method, since the ceramic layer is formed not in contiguous with the base metal, the layer may possibly be peeled from the base metal upon undergoing high contact stress. Accordingly, this method can not provide a sufficient durability as the constituent components for the rolling support device.

There can be mentioned a second method of work hardening the surface by cold working. This method involves a problem of giving magnetic property since fabrication induced transformation is caused to make the austenite into martensite.

There can be mentioned, as a third method, a heat treatment such as carburizing or carbonitriding. However, the austenitic non-magnetic steels are less carburized, different from general bearing steels. In addition, since increase of the hardness utilizing the martensitic transformation can not be expected in the steels, it is necessary to harden the surface layer, for example, by precipitating a great amount of carbides or carbonitrides. In this case, since Cr having high affinity with carbon is precipitated predominantly as carbides to possibly lower the non-magnetic property or the corrosion resistance.

As described above, no constituent components for the rolling support device comprising a non-magnetic material and having sufficient durability and corrosion resistance have yet been obtained by the prior art method. A second subject of the present invention is to provide a rolling support device comprising constituent components which are non-magnetic and excellent in the durability and the corrosion resistance.

DISCLOSURE OF THE INVENTION

The present inventors have made a study as to whether the corrosion resistance and the durability can be improved outstandingly by using austenitic stainless steels of excellent corrosion resistance as the base metal and applying surface modification to the surface layer thereof by a heat treatment. It has been well-known that the austenitic stainless steels have a Cr oxide layer (passivation layer) on the surface and, accordingly, carburizing is difficult and modification of the surface layer by gas carburizing is not easy.

For example, ion nitriding or plasma carburizing is typical as the surface modification for the stainless steels but since this utilizes electric discharging phenomenon, they lack in the mass productivity and has a difficulty in forming a homogeneous treated layer to a product of a complicated shape. Therefore, while it is preferred to adopt the surface modification by utilizing gas reaction, since oxide layers (Cr oxide layer described above) that hinder the gas reaction are present in the austenitic stainless steels, no uniform or homogeneous treated layer can be formed by existent nitriding or carburizing.

In view of the above, the present inventors have made a study on the possibility of the surface modification by the gas reaction by applying fluoriding as a pre-treatment to nitriding or carburizing in order to remove the Cr oxide layer.

At first, it has been studied for the adoptability of "Nv nitriding process (trade name of products of Daido Hokusan Co.)" of conducting fluoriding treatment for nitriding process. This treatment comprises, as the pre-treatment for nitriding, a process of applying fluoriding by using a fluoric gas such as $NF_3$ (nitrogen trifluoride) at about 200 to 400° C. and a process of applying nitriding by an $NH_3$ gas. By the fluoriding, the Cr oxide layer inhibiting the nitriding reaction is removed and an extremely thin fluoride layer is formed on the surface layer to highly activate the surface and it is possible to stably form a homogeneous nitride layer by the subsequent nitriding.

In the case of the austenitic stainless steels, a hardness at Hv 1000 or more can be obtained by transformation of the nitride layer from the austenite to nitrogen compounds. While the slidability can be improved outstandingly by the treatment, the austenitic stainless steels per se have extremely low hardness. Accordingly, a large contact stress that the rolling support device undergoes can not be supported only by the nitride layer formed on the surface (nitride layer comprising extremely thin and brittle compound) and no sufficient durability can be obtained. In addition, it also results in a problem that the corrosion resistance and the non-magnetic property of the base metal are also deteriorated.

Then, it has also been studied on the possibility of using the carburizing process, different from nitriding type process, for example, "Pyonite process (trade name of products of Daido Hokusan Co.)". This treatment is identical with the Nv nitriding process described above in that fluoriding is applied at about 200 to 400° C. by using a fluoric gas such as $NF_3$ (nitrogen trifluoride). However, this is different from the Nv nitriding process in that carburizing by a carburizing gas is applied subsequently instead of the process of applying nitriding by the $NH_3$ gas. That is, the treatment comprises a process of conducting fluoriding by using a fluoric gas and a process of applying carburizing by using a carburizing gas.

According to this method, the Cr oxide layer inhibiting the carburizing reaction is removed by the fluoriding and an extremely thin fluoride layer is formed on the surface layer. This can highly activate the surface and form a homogeneous carburizing hardened layer stably by the subsequent carburizing. While the carburizing is usually conducted at a high temperature of 800° C. or higher, carburizing in the Pyonite process is applied at a low temperature of about 500° C.

As described above, the present inventors have accomplished the invention based on the finding that a rolling support device more excellent in the corrosion resistance and the durability can be provided by using an austenitic stainless steel and fabricating the same into a desired shape, then removing a passivation layer comprising a Cr oxide layer to activate the surface by fluoriding and then forming a carburizing hardened layer containing no substantial carbides in the surface layer.

That is, for solving the first subject, the present invention provides a rolling support device comprising a fixed member and a moving member each having a rolling raceway surface, and rolling elements interposed between the rolling raceway surface of the fixed member and the rolling raceway surface of the moving member in which movement of the moving member relative to the fixed member is permitted by the rolling movement of the rolling elements on the rolling raceway surface, wherein at least one of the fixed member, the moving member and the rolling elements comprises an austenitic stainless steel, and the rolling raceway surface or the rolling element surface has a carburizing hardened layer containing no substantial carbides with a Vickers hardness (Hv) of 650 or more.

When carbides are formed due to diffused carbon upon forming the carburizing hardened layer on the surface of the component, the carbides worsen the corrosion resistance on the surface of the component. In order to avoid formation of the carbides, the diffused carbon is solid solubilized into gaps of the austenitic crystal structure thereby forming a carburizing hardened layer containing no substantial carbides.

According to the rolling support device of the present invention, since the carburizing hardened layer containing no substantial carbides is present on the raceway surface or the rolling contact surface, favorable corrosion resistance can be obtained.

In the rolling support device according to the present invention, the thickness of the carburizing hardened layer is preferably 0.5% or more and 2.1%. or less of the diameter for the rolling element.

In the rolling support device according to the present invention, the composition for the austenitic stainless steel preferably satisfies the following equation (1):

$$(Cr)+3.3(Mo) \geq 20.0 \quad (1)$$

where (Cr) represents a chromium content (wt %) and (Mo) represents a molybdenum content (wt %).

In the rolling support device according to the present invention, the content of sulfur (S) in the austenitic stainless steel is preferably 0.030% by weight or less.

The rolling support device according to the present invention is to be described in details.

The carburizing hardened sintered layer is preferably formed at a treating temperature of 540° C. or lower. That is, when the carburizing temperature is 600° C. or higher, carbon is bonded with Cr in the steel to form Cr carbides and the Cr carbides are present in the carburizing hardened layer, so that the corrosion resistance is lowered and dimensional change after the heat treatment is increased.

On the contrary, at a treating temperature of 540° C. or lower, carbon diffused by carburizing is less bonded with Cr but merely diffuses by solid solution into gaps of austenitic face-centered cubic lattices. As a result, a surface hardened layer (carburizing hardened layer) of high toughness containing no substantial carbon can be obtained. Further, when the treating temperature is 540° C. or lower, the dimensional change is also decreased.

In order to form the carburizing hardened layer to a thickness of 0.5% or more of the diameter for the rolling element while restricting the treating time so as not to greatly increase the production cost, the treating temperature is preferably 460° C. or higher.

In the present invention, the carburizing hardened layer containing no substantial carbides is defined that the presence of carbides apparently formed by carburized carbon can not be observed by an optical microscope (magnification: 400 to 600×). Accordingly, a carburizing hardened layer containing carbides to such an extent as remaining extremely slightly after the solid solution treatment is included within the range of "carburizing hardened layer containing no substantial carbides".

Further, when the content of sulfur (S) in the austenitic stainless steel exceeds 0.030% by weight, the carburizing is hindered. It also deleterious in view of the corrosion resistance.

Further, use of the austenitic stainless steel of a composition satisfying the equation (1) above can improve the corrosion resistance and the pit corrosion resistance. That is, both of Cr and Mo are elements effective to the improvement for the corrosion resistance of the steel and they are particularly effective when added in combination. The effect for improving the pit corrosion resistance by the addition of Mo corresponds to 3.3 times of Cr.

Further, while it is known that Cr and Mo are elements that inhibit carburizing, they rather act as carburizing improving elements when carburizing is applied at a temperature of 540° C. or lower. Accordingly, when the austenitic stainless steel satisfying the equation (1) is used, it tends to particularly improve the carburizing and improve both the depth of the hardened layer and the surface hardness.

On the other hand, in the rolling support component according to this invention, SUS 316 containing Mo is preferably used as the austenitic stainless steel. In the case of SUS 316, the upper limit for "(Cr)+3.3(Mo)" is Cr (19.0)+3.3×Mo(2.75)=28.1(%). In the case of SUS 317 containing Mo, the upper limit for "(Cr)+3.3(Mo)" is Cr(10.0)+3.3×Mo(4.0)=33.2(%).

Accordingly, the composition for the austenitic stainless steel used in the present invention preferably satisfies "$20.0 \leq (Cr)+3.3(Mo) \leq 33.2$".

In the rolling support member of the present invention, an austenitic stainless steel at (Mo)=0 can also be used.

Further, in the present invention, the thickness of the carburizing hardened layer is preferably 0.5% or more of the diameter Da for the rolling element by the reason as described below.

When the thickness of the carburizing hardened layer (depth from the surface) is 0.5% or less of Da, the strength of the base metal is insufficient when undergoing high contact stress at the contact surface between the rolling element and the fixed member or the moving member. As a result, plastic deformation tends to occur and sufficient life can not sometimes be ensured. When the thickness of the carburizing hardened layer is 0.5% or more of Da, the durability is improved outstandingly in addition to the wear resistance due to the effect such as increase of the surface strength and fabrication hardening for the core portion.

For the range of the thickness of the carburizing hardened layer, the upper limit is defined as 2.1% Da (2.1% of Da) and the lower limit is defined as 0.5% Da (refer to Table 2 and FIG. 3), since it may sometimes be used under a lighter load than the bearing. When the thickness of the carburizing hardened layer exceeds 0.1% Da, it is necessary to either take a longer time for the carburizing or rising the carburizing temperature. However, longer treating time leads to increased cost or elevation of the treating temperature results in lowering of the corrosion resistance.

On the other hand, for solving the second subject, it is necessary in the rolling support component according to the present invention that at least the moving member comprises an austenitic stainless steel with an Ni equivalent amount shown by the following equation (2) is 12.0 or more. The rolling support component of this constitution is referred to as a second rolling support device according to the present invention.

$$\text{Ni equivalent amount} = (Ni)+(Co)+0.5(Mn)+0.3(Cu)+25(N)+30(C) \quad (2),$$

where [M] represents the content (wt %) for the ingredient M.

When the moving member is formed of an austenitic stainless steel with the Ni equivalent amount of less than 12.0, fabrication-induced martensitic deformation may possibly be caused under the surface near the position for the maximum shearing stress by rolling contact fatigue, to possibly introduce the magnetic property to the surface of the raceway component.

The upper limit for the Ni equivalent amount has no particularly restriction in view of the performance as the rolling support device but it is properly set considering other points. The upper limit for the Ni equivalent amount is practically 20.0, for example, considering the use of easily available commercial austenitic stainless steels. Further, since Ni is an expensive element, it is preferred that the Ni content is 17% by weight or less to render the Ni equivalent amount within a range of the present invention by incorporating other elements.

The austenitic stainless steel may sometimes contain a slight amount of ferrite ingredients in a state after being rolled. This state is not preferred and the incorporation of the ferritic ingredient may deteriorate the magnetic permeability or the ferritic ingredient may react with the carburizing gas upon carburizing and resultant carbides may deteriorate the corrosion resistance. Accordingly, it is preferred to use an austenitic stainless steel subjected to solid solution.

Further, when the surface hardness of the carburizing hardened layer is made 650 or more by Vickers hardness (Hv) and the thickness is made 0.5% or more of the diameter for the rolling element, the wear resistance and the load resistance are made favorable to attain sufficient durability.

The carburizing hardened layer containing no substantial carbides are formed, for example, by the following method.

At first, prior to carburizing or carbonitriding, the Cr oxide layer (passivation layer) formed on the surface of the austenitic stainless steel is removed by fluoriding. The fluoriding is applied by heating the raceway component formed from an austenitic stainless steel into a predetermined shape, for example, at 200 to 400° C. in a nitrogen fluoride ($NF_3$) atmosphere. This fluorides the Cr oxide layer present on the surface of the austenitic stainless steel and activates the same easy to be carburized or carbonitrided.

Then, carburizing or carbonitriding is applied to the fluorided raceway component. The carburizing or carbonitriding is preferably applied at a temperature of 540° C. or lower. The reason is as has been described above.

The carburizing is applied, for example, by heating and keeping the material at 460 to 520° C. in a gas mixture atmosphere of RX gas and $CO_2$ gas. Alternatively, it is applied by heating and keeping the material in vacuum or at a reduced pressure of 133 Pa or less at a temperature of 460 to 520° C. by using an unsaturated hydrocarbon gas such as acetylene or ethylene.

In the former carburizing method, since iron is oxidized to form an oxide layer comprising black $Fe_3O_4$, the appearance performance and corrosion resistance may be sometimes deteriorated. Accordingly, it is preferred to remove the oxide layer by pickling after the carburizing. In the latter carburizing method, since such oxide layer is scarcely formed, there is no particular problem by merely applying soft blasting as the post treatment. Accordingly, the latter carburizing method is adopted preferably.

The restrictions described above are at least for the moving member and such restrictions are not applied to other constituent components (fixed member or rolling element), and bearing steels such as SUJ2 or martensitic stainless steel may also be used as the material. Further, the rolling element is preferably made of ceramics such as silicon nitride, zirconia, alumina or silicon carbide. Since this can reduce friction and wear between the rolling element and the raceway component, the durability can be improved further.

The present invention also provides a rolling bearing and other rolling devices in which an outer member and an inner member are moved relatively by way of rolling movement of a plurality of rolling elements inserted between them, wherein at least one of the outer member, the inner member and the rolling element comprises an austenitic stainless steel and has a carburizing hardened layer at Hv 650 or more formed on the surface thereof.

The rolling device referred to in the present invention is a collective name for the devices in which an outer member and an inner member are moved relatively by way of the rolling movement of a plurality of rolling elements inserted between them, which specifically include, for example, ball bearings, as well as those devices such as ball screws and linear motion guide devices. In the specification, the outer member means the outer ring for the rolling bearing, the nut for ball screw and the bearing (slider) for the linear motion guide device, while the inner member means the inner ring for the rolling bearing, the screw shaft for the ball screw and the guide rail for the linear motion guiding device.

BEST MODE FOR PRACTICING THE INVENTION

First Embodiment

The mode of practicing the rolling device according to the present invention is to be described with reference to the drawings.

Figure 1:
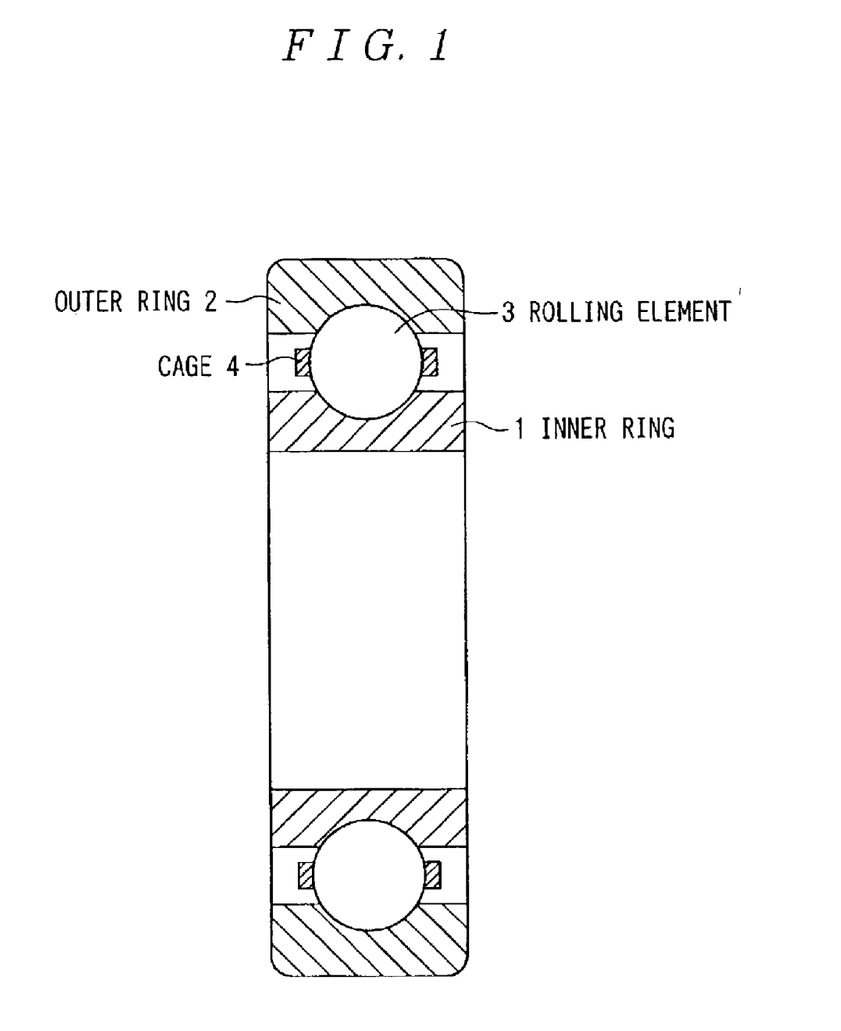
FIG. 1 is a vertical cross sectional view illustrating an embodiment of a rolling bearing according to the present invention.

FIG. 1 is a cross sectional view of a rolling bearing as an embodiment of the present invention. The rolling bearing comprises a plurality of rolling elements (balls) 3, an inner ring (fixed member or a moving member) 1 situated inward thereof and an outer ring (fixed member or a moving member) 2 situating outward thereof in which the rolling elements 3 are guided under rolling while being held between the inner ring 1 and the outer ring 2. In this case, a rolling groove (rolling raceway surface) for guiding the rolling elements 3 is formed to the inner ring 1 and the outer ring 2, and the rolling elements 3 are held in the rolling groove by a cage 4 in an equally distributed arrangement.

In all examples and comparative examples of this embodiment, ball bearings 695 (JIS bearing number) were assembled as the rolling bearing having the structure shown in FIG. 1, and evaluation test for the quietness and various kinds of durability of the bearings was conducted. As the rolling elements to be assembled in the bearings of the examples and the comparative examples, rolling elements made of SUS 440C for $Si_3N_4$ were used and a cage made of a fluoro resin was used for the cage.

As the base metal material for constituting the inner ring 1 as the inner member, the outer ring 2 as the outer member and the rolling element 3, austenitic stainless steels are used. They can include, specifically, SUS 304, SUS 316 and SUS 317. Those steels put to heat treatment for solid solution are preferably used.

Further, since austenitic stainless steels are generally poor in the machinability, those containing freely cutting elements such as S, Se, Te and Pb are often used and, for example, ferritic stainless steels can include SUS 440F and austenitic stainless steels can include SUS 303 and SUS 303Se.

Among them, since S has an effect of hindering carburizing property and is also deleterious in view of the corrosion resistance, the content is restricted to 0.03% or less. Further, it is preferred that the relation between the amount of Cr and the amount of Mo contained can satisfy Cr %+3.3Mo %≧20.0 (%) since particularly high corrosion resistance and surface hardness can be obtained.

After fabricating the blank material into a predetermined shape, a surface hardening is applied finally to the surface layer. As the method of modifying the surface of the austenitic stainless steel in the present invention, the Pyonite process described previously can be suitably utilized for instance. The treatment conducted as a pretreatment for the carburizing comprises ① a process of conducting fluoriding at about 200 to 400° C. by using a fluoric gas such as $NF_3$ and ② a process of conducting carburizing by a carburizing gas. By the fluoriding ①, a Cr oxide layer inhibiting the carburizing reaction is removed to form an extremely thin fluoride layer on the surface layer to highly activate the surface. Accordingly, a stable homogeneous carburizing hardened layer can be formed by the carburizing ② above.

The temperature for the carburizing in this case is a low temperature of about 500° C. If the carburizing temperature is 600° C. or higher, carbon is bonded with Cr in the steel to form Cr carbides, which lower the corrosion resistance and increase the dimensional change after the heat treatment, so that the treating temperature is preferably 540° C. or lower. At a temperature lower than 540° C., since carbon diffused by carburizing is less bonded with Cr but merely diffused by solid solution into gaps of the face-centered cubic lattices of the austenite and hardened, a surface hardened layer of high toughness with no substantial presence of carbides can be obtained with extremely small dimensional change. Preferably, the surface hardness is HRC 60 (Hv 697) or more and, further preferably, HRC 62 (Hv 746) or more.

For the carburizing gas, a mixture of gases such as Co, $CO_2$ and $H_2$ is used. After the treatment, oxidation of Fe with $CO_2$ gas is taken place on the uppermost surface layer to form a black oxide layer comprising $Fe_3O_4$ to lower the corrosion resistance. Accordingly, it is preferred to conduct a pickling treatment after the carburizing to remove the black oxide layer. There is no particular restriction on the processing solution used for the pickling treatment and hydrofluoric acid, nitric acid, hydrochloric acid, sulfuric acid or a liquid mixture thereof may be used.

Further, the carburizing is preferably conducted by using an unsaturated hydrocarbon gas such as acetylene or ethylene as the carburizing gas in vacuum or at a reduced pressure of 133 Pa or less, since formation of the black oxide layer deleterious to the corrosion resistance can be suppressed, to prevent also uneven carburizing caused by sooting which particularly brings about a problem during carburizing.

Further, the austenitic stainless steel as the base metal is preferably applied with heat treatment for solid solution. This is applied so that ferrite remaining in the steel does not react with the carburizing gas to form carbides during carburizing to deteriorate the corrosion resistance.

Further, since no sufficient durability can be obtained if the thickness of the carburizing hardened layer at the surface of the completed product is small, the carburized layer is formed to a thickness of at least 0.5% or more of the rolling element diameter (Da).

Since the rolling element is held by the inner ring 1 and the outer ring 2 and, further, protected by grease or lubricant, it cause less problem in view of corrosion resistance. Accordingly, the rolling element may be made of martensitic stainless steel but it is preferably made of ceramics since they are less coagulative and can suppress wearing.

Successively, a durability test conducted on the rolling bearing of this embodiment is to be explained.

The durability was evaluated using ball bearings with a JIS bearing number of 608 both for the examples and the comparative examples. Rolling elements made of SUS 440 and $Si_3N_4$ and a cage made of a fluoro resin were assembled in the ball bearings.

At first, inner rings and outer rings were fabricated each into a desired shape by lathing using five kinds of materials (A-1 to A-5) described in Table 1.

Subsequently, they were subjected to various heat treatments under the following conditions.

Heat Treatment Condition A:
After heating and keeping in a gas comprising nitrogen mixed with 10% nitrogen trifluoride at 260 to 350° C. for 20 to 30 min, they were heated and kept at 460 to 520° C.×30 hr in a carburizing gas (mixed gas atmosphere of $RX+CO_2$).

Heat Treatment Condition B:
After heating and keeping in a gas comprising nitrogen mixed with 10% nitrogen trifluoride at 260 to 350° C. for 20 to 30 min, they were heated and kept at 460 to 520° C.×30 hr under a reduced pressure of 39.9 Pa while mixing acetylene gas.

Heat Treatment Condition C:
After heating and keeping in a gas comprising nitrogen mixed with 10% nitrogen trifluoride at 260 to 350° C. for 20 to 30 min, they were heated and kept at 400 to 450° C.×40 hr in a gas mixture of ammonia and nitrogen under a reduced pressure of 39.9 Pa.

Further, for the heat treatment conditions A and B, they were immersed in a mixed solution of hydrofluoric acid and nitric acid for 5 to 20 min and then subjected to a soft blasting treatment. For the heat treatment condition C, since remarkable leaching of the base metal was observed when the pickling treatment was applied, no particular after treatment was applied.

Further, evaluation was conducted also for other comparative examples in a case of usual austenitic stainless steel and SUS 440C as martensitic stainless steels in which inner/outer rings are not subjected to the surface hardening treatment.

The evaluation was conducted by a torque life test, salt spray and pit corrosion potential measurement.

In the torque life test, a rotational test was conducted in vacuum at $1.3 \times 10^{05}$ Pa, at a number of rotation of 1,000 rpm and under an axial load of 19.6N and the instance the torque reached twice the initial torque value was evaluated as the life. Further, in the salt spray test, a salt spray test according to JIS Z 2371 was conducted for the inner rings of the bearings and they were indicated by "◉" for those not suffering from rust at all, "○" for those with slight rust, "Δ" for those in which apparent rust was recognized and "X" in which remarkable rust was observed substantially over the entire surface.

Further, test pieces each of 18 mm diameter×5 mm length were cutout from the steel material used for the bearings and subjected to the same heat treatment, for which pit corrosion potential was measured in accordance with JIS G 0577.

The result of evaluation is shown in Table 2.

The pit corrosion potential value in Table 2 is shown by the ratio to the pit corrosion potential in SUS 304 Comparative Example C-2 being assumed as 1. That is, a greater value shows that the corrosion resistance is more excellent.

The surface hardness in Table 2 is described by values obtained by slightly mirror finishing the end face of bearing rings and then measuring by a Vickers hardness gage under 100 g of load. Further, the treated layer depth is described by values obtained by cutting bearing rings, embedding them in a thermoplastic resin, applying etching with a marble reagent on the mirror face finished cross section and measuring the treated layer thickness observed distinctly by a microscope.

From the result shown in Table 2, it can he confirmed that the examples of the present invention are excellent over the comparative examples in view of the torque life and the corrosion resistance. On the contrary, C-1–C-4 as the comparative examples show a case of using existent austenitic stainless steels. However, since the surface hardness and the wear resistance are not insufficient, no sufficient durability can be obtained.

Further, Comparative Example C-5 is an example in which the material for the inner and outer rings are made of SUS 303 containing more S than in the present invention. Since S hinders carburizing, it is poor in view of the surface hardness and the treated layer depth than the present invention and also poor in view of the durability than the present invention. Further, Comparative Example C-6 is an example in which SUS 304 as a not heat treated solid solution product is carburized. Since ferrite remaining in the steel is reacted with the carburizing gas and deposited as carbides, it is poor in view of the corrosion resistance compared with the present invention.

Figure 2:
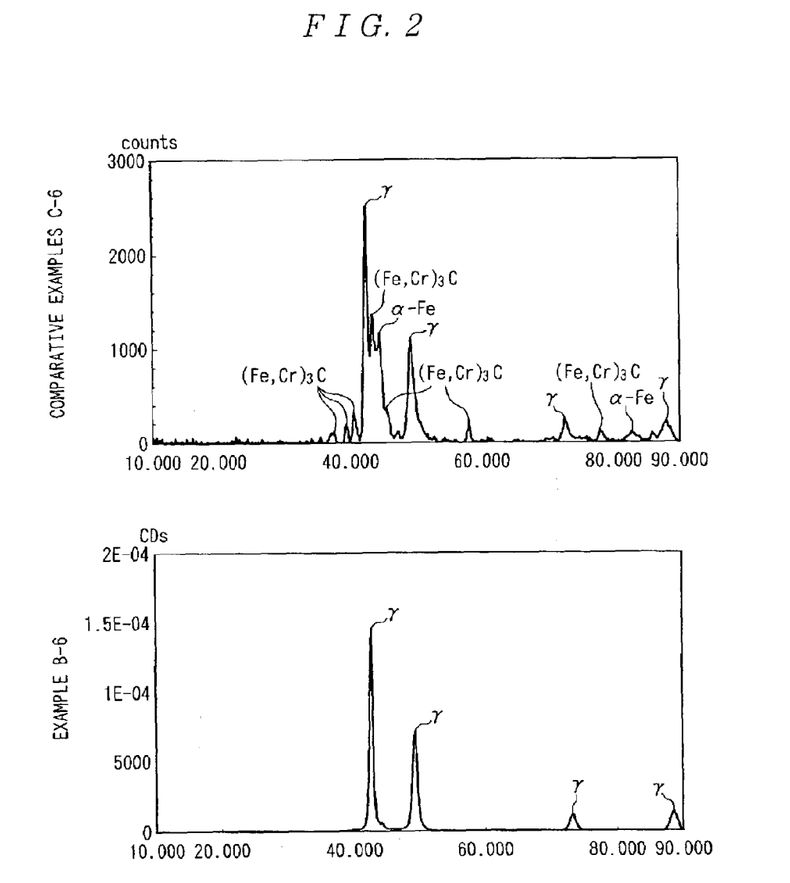
FIG. 2 is an X-ray diffraction chart for inner rings in comparative examples and examples obtained from the result of the test for a first embodiment.

FIG. 2 shows the result of the X-ray diffractometry of the inner rings for Comparative Example C-6 and Example B-6. While peaks for the ferrite and carbides are observed respectively in Comparative Example C-6, peaks for the carbides are scarcely observed in the example.

Further, Comparative Examples C-7 and C-8 are examples in which the depth of the treated layer is less than 0.5% of the rolling element diameter Da. The thickness of the treated layer for the stress volume is small and the durability is poor compared with the present invention.

Further, Comparative Example C-9 is an example of applying nitriding. Since a hard and brittle compound layer is formed on the surface layer in a case of nitriding, the nitride layer is liable to be damaged when undergoing high contact stress if the core portion has no sufficient hardness, to result in poor durability compared with the example of the invention. Further, it is inferior also in view of the corrosion resistance compared with the examples. Further, Comparative Example C-10 is an example of an existent SUS 440C bearing. The durability is remarkably poor compared with the example.

Further, it is more preferred, also in view of the reliability, to conduct carburizing in vacuum or at a reduced pressure by using an unsaturated hydrocarbon gas such as acetylene rather than the using an RX gas as the carburizing gas since more stabilized surface quality can be obtained for the bearing ring and there is no uneven carburizing by sooting. Further, since formation of the black oxide layer on the surface layer can also be suppressed, the surface is more clean after the subsequent pickling or blasting treatment.

Figure 3:
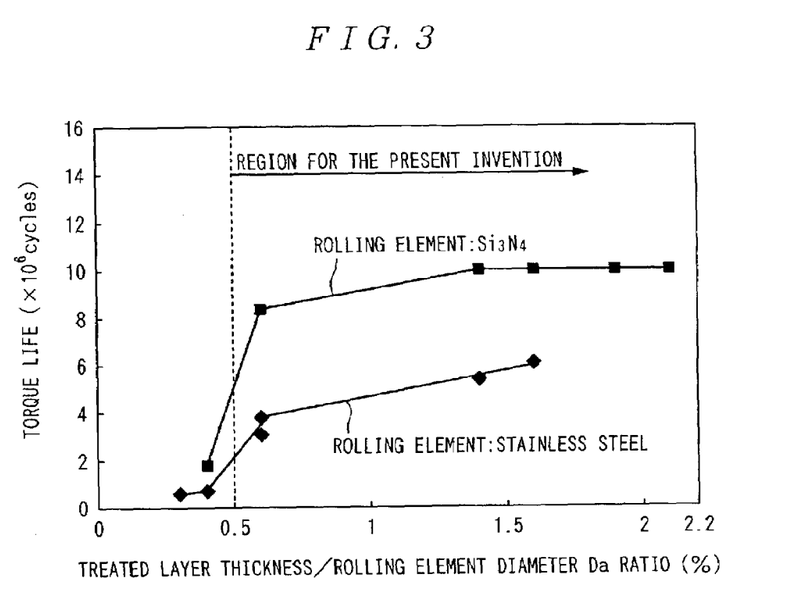
FIG. 3 is a chart expressing the relation between the thickness of the surface treatment layer of a bearing ring and a bearing torque life obtained from the result of the test for the first embodiment.
Figure 4:
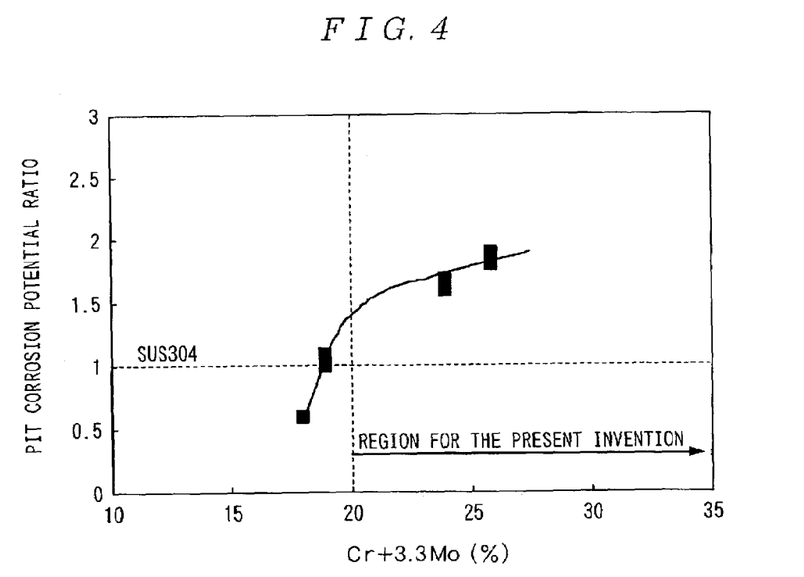
FIG. 4 is a chart showing the relation between the Cr, Mo contents in the steel and the pit corrosion potential obtained from the result of the test for the first embodiment.

FIG. 3 shows a relation between the thickness of the surface treated layer and the torque life of the inner/outer rings. It can be seen from FIG. 3 that satisfactory durability tends to be obtained when the thickness of the treated layer is 0.5% or more of the rolling element diameter Da. Further, FIG. 4 shows a relation between the contents of Cr and Mo in the steel and the pit corrosion potential. It can be seen from FIG. 4 that particularly favorable corrosion resistance can be obtained when the value for Cr+3.3Mo % is 20% or more.

While the embodiment has been described above to a case where the rolling device is a rolling bearing, the present invention is applicable in the same manner also to other rolling devices including ball screws or linear motion guide device.

Second Embodiment

Ball bearings of a JIS bearing No. 608 was manufactured as described below. The ball bearing comprises, as shown in FIG. 1, an inner ring (fixed member or moving member) 1, an outer ring (fixed member or moving member) 2, balls (rolling elements) 3 and a cage 4.

The inner ring and the outer ring are at first fabricated into a predetermined shape from various kinds of iron and steel materials shown in the following Table 3 by cutting a blank material by lathing. As the iron and steel materials, austenitic stainless steels (SUS 316, SUS 316L, SUS 316J1, SUS 317, SUS 317J1, SUS 303 and SUS 304) and Mn—Cr—Ni—V series precipitation hardening type austenitic non-magnetic steels ([YHD 50] manufactured by Hitachi Kinzoku Co.) which were subjected to solid solution were provided.

Then, for the inner ring and the outer ring comprising the austenitic stainless steel, grinding finishing was applied and then fluoriding was applied under the following conditions. The fluoriding conditions are at a temperature of 260 to 350° C., in an atmospheric gas as a gas mixture of nitrogen ($N_2$) and nitrogen trifluoride ($NF_3$) ($NF_3$ 10% contained), for a treating time of 20 to 30 min. Then, the carburizing was applied under the following conditions. The carburizing conditions were at a temperature of 460 to 520° C., in a carburizing gas comprising acetylene gas, for a treating time of 12 to 60 hours, at a surrounding pressure of a reduced pressure of 39.9 Pa. Then, surface finishing was applied by soft blasting.

The inner ring and the outer ring comprising [YHD 50] were subjected to an aging treatment at 680 to 720° C. for 4 to 5 hours and then applied with grinding finishing.

For the inner rings and the outer rings obtained by the method as described above, the surface hardness and the thickness of the carburized hardened layer were measured. For the surface hardness, the end face of the inner ring (one end face in the axial direction) was polished into a mirror face, and a Vickers hardness test was conducted to the mirror face at a load of 50 g. The thickness of the carburizing hardened layer was measured by the following method.

At first, the sample cut out from the inner ring was mirror face polished while being buried in a resin to expose the cross section of the sample. Then, after etching the cross section with a marble agent, the etched cross section was observed microscopically to measure the thickness for the portion appearing white. By dividing the measured value with the diameter of the rolling element, the ratio (%) for the thickness of the carburizing hardened layer to the diameter of the rolling element was calculated. The results are also shown together in the following Table 3.

Respective rolling bearings of Examples 1 to 6 and Comparative Examples 1 to 4 were assembled by using the inner rings and the outer rings described above, the rolling element made of $Si_3N_4$ and a cage made of a fluoro resin. For the inner ring and the outer ring, those made of the identical material and applied with the identical treatment were used in combination.

For each of the rolling bearings manufactured as described above, torque life test, measurement for magnetic permeability and corrosion resistance test were conducted in vacuum.

The test conditions for the torque life test were at an axial load of 19.6N, a rotation speed of 1000 rpm, temperature of 25° C. and vacuum degree of $1.3 \times 10^{-5}$ Pa. The number of rotation at which the detected torque value was twice the initial value was measured as "torque life". However, in a case where the detected torque value did not reach twice the initial value even when the number of rotation exceeded $10 \times 10^6$ cycles, the rotation test was stopped and the rotational life was judged as $10 \times 10^6$ cycles or more.

The magnetic permeability was measured before and after the torque life test by using a vibrating type magnetic gage to calculate the amount of degradation for the permeability by the torque life test. For the corrosion resistance test, a salt spray test was conducted according to "JIS Z 2371" for one week. The result of the salt spray test was evaluated as "○" when rust did not occur at all, as "Δ" when slight rust was observed and as "X" in a case where rust was observed remarkably after the test.

Figure 5:
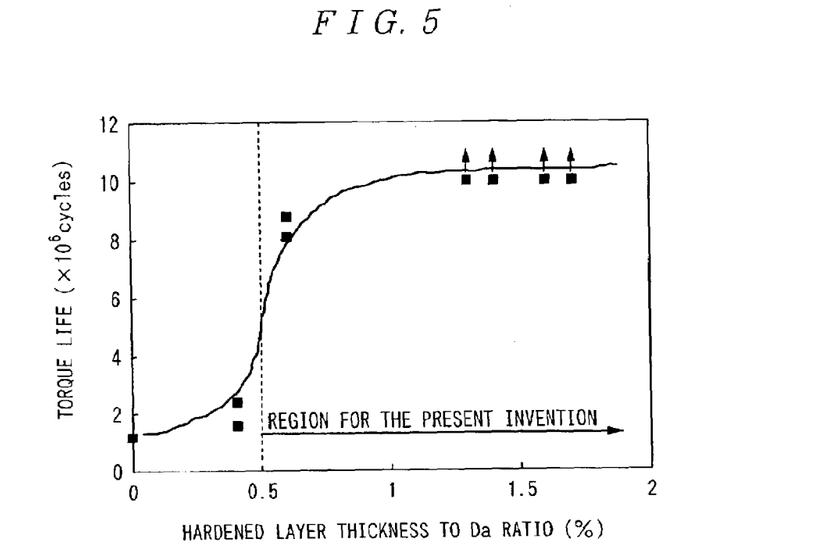
FIG. 5 is a graph showing the relation between the ratio of the thickness of the hardened layer for the inner ring and the outer ring relative to the rolling element diameter (Da) and the torque life obtained from the result of the test for a second embodiment.
Figure 6:
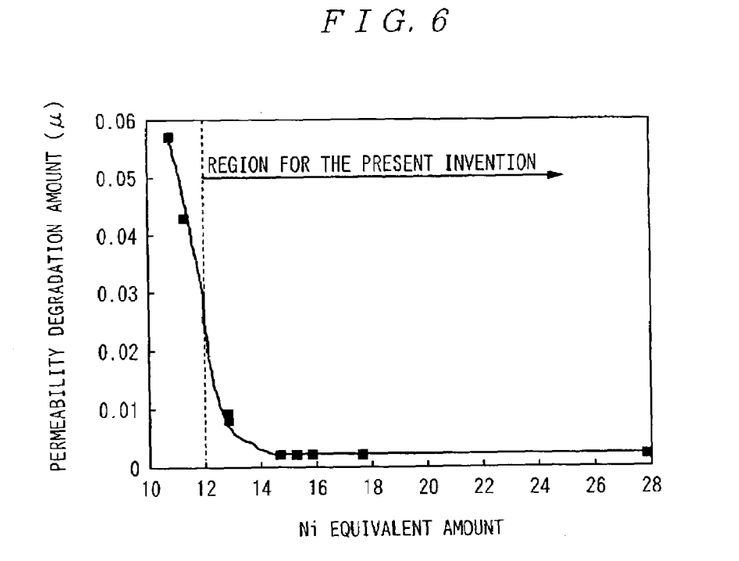
FIG. 6 is a graph showing the relation between the Ni equivalent amount in the steel used for the inner ring and the outer ring and the degradation amount of the magnetic permeability by the torque life test obtained from the result of the test for the second embodiment.

The result for the tests were also shown together in the following Table 3. Further, FIG. 5 shows "relation between the ratio of the thickness of the hardened layer to the rolling element diameter (Da) and the torque life" and FIG. 6 shows "relation between the Ni equivalent amount of the steel used and the amount of degradation for the magnetic permeability by the torque life test" obtained from the result each in the graph.

As can be seen from FIG. 3, rolling bearings of Examples 1 to 6 in which the inner ring and the outer ring satisfy all of the constituent factors in claim 2 of the present application were satisfactory in all of the torque life, non-magnetic permeability and the corrosion resistance. That is, the torque life was longer, the permeability before the test was small, the amount of degradation of the magnetic permeability was small and the result of the salt spray test was "○". On the contrary, rolling bearings of Comparative Examples 1 to 4 which did not satisfy one or more of the constituent factors described above was not favorable in at least one of the torque life, the non-magnetic property and the corrosion resistance.

In Comparative Example 1, since the Ni equivalent amount was less than 12.0, the permeability before the test and the amount of degradation for the permeability were increased relatively larger and it was poor in view of the non-magnetic property. Further, since the surface hardness was as small as Hv 602 and the ratio of the thickness of the hardened layer to the rolling element diameter (Da) was also less than 0.5, it was poor also in the torque life and the corrosion resistance.

In Comparative Example 2, since the Ni equivalent amount was less than 12.0, the permeability before the test and the amount of degradation for the permeability were increased relatively larger and it was poor in view of the non-magnetic property. In Comparative Example 3, since the ratio of the thickness of the hardened layer to the rolling element diameter (Da) was less than 0.5, it was poor in the torque life. Further in Comparative Example 4, since the surface hardness was as small as Hv 446, it was poor in the torque life and in the corrosion resistance.

Further, it can be seen from the graph of FIG. 5 that when the ratio of the thickness of the hardened layer to the rolling element diameter (Da) is 0.5 or more, the torque life is favorable. It can be seen from the graph of FIG. 6 that when the Ni equivalent amount of the steel used is 12.0 or more, the amount of degradation of the magnetic permeability by the torque life test is decreased. That is, when the Ni equivalent amount of the steel used for the inner ring and the outer ring is made 12.0 or more, it can be seen that the non-magnetic property can be kept satisfactorily even undergoing rolling fatigue.

From the foregoing results, the rolling bearing corresponding to the second rolling support device according to the present invention is non-magnetic and, in addition, it is excellent in the durability and the corrosion resistance.

Further, while the explanation has been made in this embodiment to a ball bearing where the rolling element is a ball but the present invention is also applicable to a cylindrical roller bearing in which the rolling element is a cylindrical or a tapered roller bearing in which the rolling element is in a conical shape. In a case where the rolling element is cylindrical, the diameter for the cross sectional circle of the cylinder is defined as the diameter for the rolling element. Furthermore, when the rolling element is in the conical shape, an average value between the maximum diameter and the minimum diameter is defined as the diameter of the rolling element.

Further, while the rolling bearing has been explained as an example of a rolling support device in this embodiment, the present invention is also applicable to other rolling support devices than the rolling bearing (for example, ball screws or linear guide).

In the ball screw, the screw shaft is a fixed member while the nut is a moving member. In the linear guide, one of the guide rail and the slider is a fixed member and the other of them is the moving member.

TABLE 1

| Symbol | Cr % | Mo % | S % | Cr + 3.3 Mo % | Remarks |
|---|---|---|---|---|---|
| A-1 | 17.94 | — | 0.17 | 17.94 | SUS 303 heat treated solid solubilized product |
| A-2 | 18.76 | — | 0.026 | 18.76 | SUS 304 not heat treated solid solubilized product |
| A-3 | 18.87 | — | 0.025 | 18.87 | SUS 304 heat treated solid solubilized product |
| A-4 | 16.87 | 2.1 | 0.024 | 23.80 | SUS 316 heat treated solid solubilized product |
| A-5 | 17.12 | 2.6 | 0.025 | 25.70 | SUS 316 heat treated solid solubilized product |

TABLE 2

| | Material | | | Treated layer | | | Corrosion resistance | |
|---|---|---|---|---|---|---|---|---|
| Example/ Comp Example | Rolling element | symbol (inner/ outer ring) | Heat treatment | Surface hardness (Hv) | thickness Da ratio | Torque life ×10⁶ cycles | Salt spray test | Pit corrosion potential |
| Example B-1 | SUS440C | A-3 | Condition A | 678 | 0.6 | 3.8 | ○ | 1.0 |
| Example B-2 | SUS440C | A-4 | Condition A | 812 | 1.4 | 5.4 | ⊚ | 1.6 |
| Example B-3 | SUS440C | A-5 | Condition A | 835 | 1.6 | 6.1 | ⊚ | 1.8 |
| Example B-4 | $Si_3N_4$ | A-3 | Condition A | 678 | 0.6 | 8.4 | ○ | 1.0 |
| Example B-5 | $Si_3N_4$ | A-4 | Condition A | 812 | 1.4 | 10.0 | ⊚ | 1.6 |
| Example B-6 | $Si_3N_4$ | A-5 | Condition A | 835 | 1.6 | 10.0 | ⊚ | 1.8 |
| Example B-7 | $Si_3N_4$ | A-3 | Condition B | 813 | 1.1 | 10.0 | ○ | 1.1 |
| Example B-8 | $Si_3N_4$ | A-4 | Condition B | 866 | 1.9 | 10.0 | ⊚ | 1.7 |
| Example B-9 | $Si_3N_4$ | A-5 | Condition B | 903 | 2.1 | 10.0 | ⊚ | 1.9 |

TABLE 2-continued

| Example/ Comp Example | Rolling element | Material symbol (inner/ outer ring) | Heat treatment | Surface hardness (Hv) | Treated layer thickness Da ratio | Torque life ×10⁶ cycles | Corrosion resistance Salt spray test | Pit corrosion potential |
|---|---|---|---|---|---|---|---|---|
| Comparative Example C-1 | SUS440C | A-1 | None | 196 | — | 0.1 | Δ | 0.5 |
| Comparative Example C-2 | SUS440C | A-3 | None | 191 | — | 0.1 | ○ | 1.0 |
| Comparative Example C-3 | SUS440C | A-4 | None | 194 | — | 0.1 | ◎ | 1.0 |
| Comparative Example C-4 | SUS440C | A-5 | None | 201 | — | 0.1 | ◎ | 1.6 |
| Comparative Example C-5 | SUS440C | A-1 | Condition A | 587 | 0.3 | 0.6 | Δ | 1.8 |
| Comparative Example C-6 | SUS440C | A-2 | Condition A | 662 | 0.6 | 3.1 | Δ | 0.6 |
| Comparative Example C-7 | Si₃N₄ | A-1 | Condition B | 672 | 0.4 | 1.8 | Δ | 0.7 |
| Comparative Example C-8 | SUS440C | A-1 | Condition B | 672 | 0.4 | 0.7 | Δ | 0.7 |
| Comparative Example C-9 | SUS440C | A-3 | Condition C | 1189 | 1.0 | 2.2 | Δ | 0.5 |
| Comparative Example C-10 | SUS440C | SUS440C | — | 697 | — | 4.7 | X | −0.95 |

TABLE 3

| | Inner ring/outer ring | | | | | Magnetic permeability (μ) | | Salt spray |
|---|---|---|---|---|---|---|---|---|
| | Steel species of material | Ni eq. of material | Surface hardness (hr) | Hardened layer thickness ratio (%) | Torque life (cycles) | Before test | Degradation | test result |
| Example 1 | SUS316 | 12.8 | 785 | 0.6 | 8.8 × 10⁶ | 1.007 | 0.009 | ○ |
| Example 2 | SUS316 | 12.8 | 798 | 1.3 | 10.0 × 10⁶ | 1.006 | 0.008 | ○ |
| Example 3 | SUS316L | 14.6 | 835 | 1.4 | 10.0 × 10⁶ | 1.006 | ≦0.004 | ○ |
| Example 4 | SUS316J1 | 15.2 | 824 | 1.6 | 10.0 × 10⁶ | 1.005 | ≦0.004 | ○ |
| Example 5 | SUS317 | 15.8 | 889 | 1.7 | 10.0 × 10⁶ | 1.006 | ≦0.004 | ○ |
| Example 6 | SUS316J1 | 17.6 | 907 | 1.7 | 10.0 × 10⁶ | 1.004 | ≦0.004 | ○ |
| Comp. Example 1 | SUS303 | 10.8 | 602 | 0.4 | 1.6 × 10⁶ | 1.035 | 0.057 | X |
| Comp. Example 2 | SUS304 | 11.3 | 765 | 0.6 | 8.1 × 10⁶ | 1.021 | 0.043 | Δ |
| Comp. Example 3 | SUS316 | 12.8 | 745 | 0.4 | 2.4 × 10⁶ | 1.006 | 0.008 | ○ |
| Comp. Example 4 | YHD50 | 27.8 | 446 | No hardened layer | 1.2 × 10⁶ | 1.008 | ≦0.004 | X |

INDUSTRIAL APPLICABILITY

As described above, the present invention provides a rolling support device excellent in both of the characteristics of the durability and the corrosion resistance, and a rolling support device of a non-magnetic property and excellent in the durability and the corrosion resistance.

The invention claimed is:

1. A method of manufacturing a rolling support device adapted for use in applications requiring high pit corrosion resistance and non-magnetic durability, said device comprising:
    a fixed member and a moving member each having a rolling raceway surface, and
    rolling elements interposed between the rolling raceway surface of the fixed member and the rolling raceway surface of the moving member in which movement of the moving member relative to the fixed member is permitted by the rolling movement of the rolling elements on each rolling raceway surface, wherein
    at least one of the fixed member, the moving member and the rolling elements comprises an austenitic stainless steel consisting essentially of up to 17 wt % of nickel, up to 0.03 wt % of sulfur, up to 1.00 wt % of silicon and up to 2.00 wt % of manganese, said stainless steel including substantially no ferrite, and further comprising at least one element selected from the group consisting of carbon, molybdenum, nitrogen, chromium, copper, and cobalt, with the balance iron and inevitable impurity elements, wherein
    at least one of the rolling raceway surface of the fixed member, the rolling raceway surface of the moving member or a surface of the rolling elements has a carburizing hardened layer containing no substantial carbides with a Vickers hardness (Hv) of 650 or more,
    the composition of the austenitic stainless steel satisfies the following equation (1), and at least the moving member comprises the austenitic stainless steel with a Ni equivalent amount represented by the following equation (2):

$$20 \leq (Cr)+33(Mo) \leq 25.7 \quad (1);$$

$12.8 \leq$ Ni equivalent amount=(Ni)+(Co)+0.5(Mn)+0.3(Cu)+25(N)+30(C) $\leq 176(2);$ wherein in equation (1) (Cr) and (Mo) represent the chromium content (wt %) and the molybdenum content (wt %), respectively, and in equation (2) (M) represents the content for the ingredient M (wt %), wherein the thickness of the carburizing hardened layer is 0.5% or more and 2.1% or less of a diameter of the rolling elements, and wherein the carburizing hardened layer is formed by applying fluoriding to a material comprising an austenitic stainless steel by heating in a fluoride gas at 200° to 400° C. and then applying carburizing at a temperature of 540° C. or lower, wherein the carburizing is conducted at a reduced pressure by using an unsaturated hydrocarbon gas.

2. A method of manufacturing a rolling support device adapted for use in applications requiring high pit corrosion resistance and non-magnetic durability, said device comprising:

a fixed member and a moving member each having a rolling raceway surface, and rolling elements interposed between the rolling raceway surface of the fixed member and the rolling raceway surface of the moving member in which movement of the moving member relative to the fixed member is permitted by the rolling movement of the rolling elements on each rolling raceway surface, wherein at least one of the fixed member, the moving member and the rolling elements comprises an austenitic stainless steel consisting essentially of up to 17 wt % of nickel, up to 0.03 wt % of sulfur, up to 1.00 wt % of silicon and up to 2.00 wt % of manganese, said stainless steel including substantially no ferrite, and further comprising at least one element selected from the group consisting of carbon, molybdenum, nitrogen, chromium, copper, and cobalt, with the balance iron and inevitable impurity elements, wherein at least one of the rolling raceway surface of the fixed member, the rolling raceway surface of the moving member or a surface of the rolling elements has a carburizing hardened layer containing no substantial carbides with a Vickers hardness (Hv) of 650 or more, the composition of the austenitic stainless steel satisfies the following equation (1), and at least the moving member comprises the austenitic stainless steel with a Ni equivalent amount represented by the following equation (2):

$$20 \leq (Cr)+33(Mo) \leq 25.7 \quad (1);$$

$12.8 \leq$ Ni equivalent amount=(Ni)+(Co)+0.5(Mn)+0.3(Cu)+25(N)+30(C) $\leq 176(2);$ wherein in equation (1) (Cr) and (Mo) represent the chromium content (wt %) and the molybdenum content (wt %), respectively, and in equation (2) (M) represents the content for the ingredient M (wt %).

wherein the thickness of the carburizing hardened layer is 0.5% or more and 2.1% or less of a diameter of the rolling elements, wherein the rolling elements are made of ceramics, and wherein the carburizing hardened layer is formed by applying fluoriding to a material comprising an austenitic stainless steel by heating in a fluoride gas at 200 to 400° C. and then applying carburizing at a temperature of 540° C. or lower, wherein the carburizing is conducted at a reduced pressure by using an unsaturated hydrocarbon gas.

\* \* \* \* \*